United States Patent
Sandin

(10) Patent No.: US 6,692,780 B1
(45) Date of Patent: Feb. 17, 2004

(54) BEVERAGE INFUSION DEVICE

(76) Inventor: Sonja A. Sandin, 105 Alleyne Dr., Pittsburgh, PA (US) 15215

( * ) Notice: Subject to any disclaimer, the term of this patent is extended or adjusted under 35 U.S.C. 154(b) by 1290 days.

(21) Appl. No.: 08/661,415

(22) Filed: Jun. 7, 1996

Related U.S. Application Data

(63) Continuation-in-part of application No. PCT/US94/14217, filed on Dec. 9, 1994, and a continuation-in-part of application No. 08/164,963, filed on Dec. 10, 1993, now Pat. No. 5,441,752.

(51) Int. Cl.$^7$ ................................................. B65B 29/02
(52) U.S. Cl. .......................... 426/77; 426/78; 426/79; 426/80; 426/81; 426/82; 426/83; 426/84; 426/86; 426/112; 426/115; 426/120; 426/124; 426/433; 426/435
(58) Field of Search ........................ 426/77–84, 86, 426/110, 112, 115, 120, 124, 433, 435; 99/287, 316, 321, 323

(56) References Cited

U.S. PATENT DOCUMENTS

| | | | |
|---|---|---|---|
| 476,568 A | 6/1892 | Smith | |
| 627,166 A | 6/1899 | White | |
| 802,378 A | 10/1905 | Ellis | |
| 1,889,111 A | 11/1932 | Serr | |
| 2,143,302 A | * 1/1939 | Cross | ........................ 426/79 |
| 2,304,004 A | 12/1942 | Low | |
| 2,678,000 A | 5/1954 | Scheidt et al. | |
| 2,801,736 A | 8/1957 | Grow | |
| 2,860,989 A | 11/1958 | Geisinger | |
| 2,935,928 A | 5/1960 | Keating et al. | |
| 2,972,406 A | 2/1961 | Mayer | |
| 2,986,269 A | 5/1961 | Goldberg | |
| 3,121,636 A | 2/1964 | Toms | |
| 3,164,289 A | 1/1965 | Cocchiarella | |
| 3,186,850 A | * 6/1965 | Anthony | ........................ 426/86 |
| 3,193,388 A | 7/1965 | Conrey | |
| 3,348,469 A | 10/1967 | Kasakoff | |
| 3,407,922 A | 10/1968 | Palmer | |
| 3,657,994 A | 4/1972 | Post | |
| 3,920,120 A | * 11/1975 | Shreda | ........................ 206/217 |
| 3,927,608 A | 12/1975 | Doyel | |
| 3,935,318 A | * 1/1976 | Milailide | ........................ 426/80 |
| 3,974,758 A | 8/1976 | Stone | |
| 3,987,941 A | 10/1976 | Blessing | |
| 4,061,782 A | 12/1977 | Baxter | |
| 4,306,492 A | 12/1981 | Zimmermann | |
| 4,650,583 A | * 3/1987 | Bondanini | ................... 210/274 |
| 4,723,674 A | 2/1988 | Nunes | |
| 4,806,369 A | 2/1989 | Thompson | |
| 4,867,993 A | 9/1989 | Nordskug | |
| 4,869,159 A | 9/1989 | Yan | |
| 4,988,019 A | 1/1991 | Dawes | |
| 5,441,752 A | * 8/1995 | Sandin | ........................ 426/82 |

FOREIGN PATENT DOCUMENTS

| | | |
|---|---|---|
| AU | 3377571 | 3/1973 |
| CA | 1002001 | 12/1976 |
| DE | 820702 | 11/1951 |
| DE | 2345892 | 3/1975 |
| EP | 0615714 | 3/1994 |
| GB | 323436 | 1/1930 |
| GB | 1436397 | 5/1976 |
| GB | 2174890 | 11/1986 |
| GB | 2178948 | 2/1987 |
| GB | 2214785 | 9/1989 |
| GB | 2229991 | 10/1990 |
| GB | 2293091 | 3/1996 |
| JP | 6062946 | 4/1985 |

* cited by examiner

Primary Examiner—Curtis E. Sherrer
(74) Attorney, Agent, or Firm—Webb Ziesenheim Logsdon Orkin & Hanson, P.C.

(57) ABSTRACT

The invention is a beverage device having a beverage pack, such as a bag containing substances to be added to flavor a liquid and a shield. The shield is connected to the pack and encapsulates the pack in the bottom of a cup. The shield has an open orientation which allows beverage pack steeping and a closed orientation. The shield can be made from two portions. A stick can be used to push the shield to the bottom of the cup and orient the shield in its closed orientation.

20 Claims, 4 Drawing Sheets

BEVERAGE INFUSION DEVICE

CROSS REFERENCE TO RELATED APPLICATION

This application is a continuation-in-part of International Application PCT/US94/14217 filed on Dec. 9, 1994 and designating, inter alia, the United States and is a continuation-in-part and claiming priority to U.S. patent application Ser. No. 08/164,963 filed Dec. 10, 1993 which subsequently issued as U.S. Pat. No. 5,441,752 on Aug. 15, 1995.

BACKGROUND OF THE INVENTION

1. Field of the Invention

The present invention relates in general to tea bags and the like. More specifically, the present invention relates to a device for encapsulating a tea bag within the bottom of a cup for clean, efficient disposal.

2. Description of the Prior Art

Tea is one of the most popular drinks in the world. One convenient way of steeping tea is with a tea bag. Tea bags are conventionally used by placing the tea bag in a cup of hot water, leaving the bag in the cup until the desired strength of tea has been infused and then removing the tea bag from the cup. One drawback to the use of conventional tea bags is their sanitary disposal after use. A further drawback is the mess produced by removing the tea bag from the cup and squeezing the infused tea out of the wet tea bag. A wet tea bag is an unsightly and a messy thing to handle and dispose of. Further, if the tea bag is left in the cup, the tea bag will continue to steep causing the liquid tea to turn bitter.

Various attempts have been made to solve these tea bag problems. For example, British Reference GB-2,174,890 discloses a drinking vessel having tea contained within a bottom portion thereof. British Reference GB-2,178,948 and U.S. Pat. No. 4,061,782 disclose cups having a beverage sealed into the bottom thereof. U.S. Pat. No. 2,801,736 discloses a tea bag made from a material that becomes impervious after prolonged immersion in hot water. British Reference GB-2,229,991 discloses a tea bag attached to a container into which the used tea bag can be returned for later disposal. British References GB-2,174,890, GB-2,178, 948 and GB-2,229,991 and U.S. Pat. Nos. 2,801,736 and 4,061,782 are herein incorporated by reference. While these previous attempts have addressed various aspects of the problems associated with the use of conventional tea bags, none of these attempts has been entirely successful in producing a simple, easy to use device in which the tea bag can be retained in the cup after the desired tea strength is reached without causing the tea to turn bitter and which also provides for quickly and conveniently disposing of the used tea bag and cup.

Therefore, it is an object of the present invention to provide a device for infusing an infuser, such as a tea bag, in a liquid which allows the tea bag to be retained within the cup after a desired strength of the beverage has been reached. It is a further object of the invention to provide a device for encapsulating the tea bag within the bottom of a cup.

SUMMARY OF THE INVENTION

The beverage device of the present invention comprises a beverage pack for adding flavor to a liquid, such as water. The beverage pack can be a tea bag but is not limited thereto. For instance, the beverage pack can also have coffee or mulling spices, as examples. The beverage device also comprises a shield for encapsulating the beverage pack within a bottom of a vessel, such as a cup. The shield is preferably connected to the beverage pack.

DESCRIPTION OF THE PREFERRED EMBODIMENTS

Figure 1:
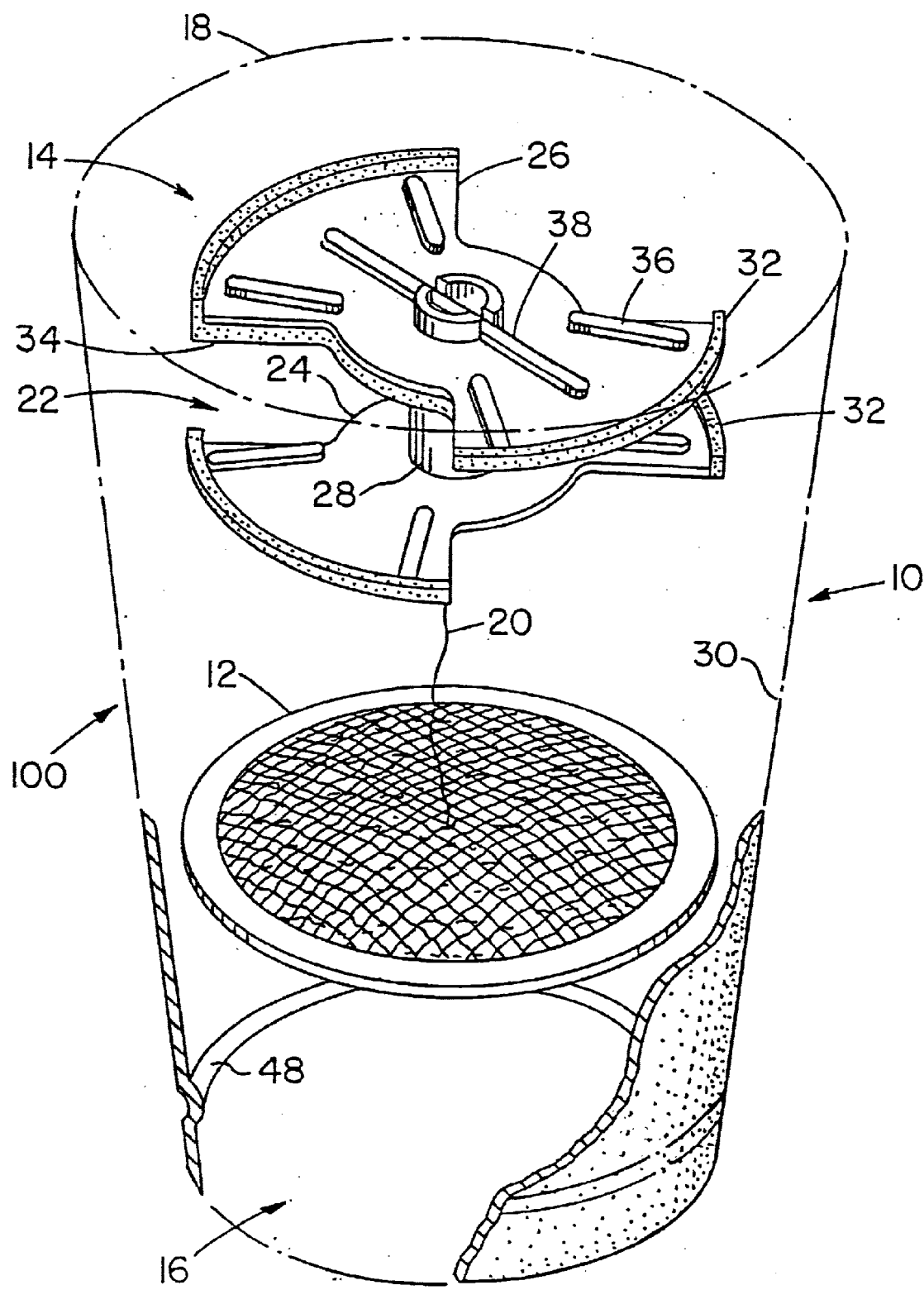
FIG. 1 is a schematic representation showing a beverage device with a shield in an open orientation.
Figure 2:
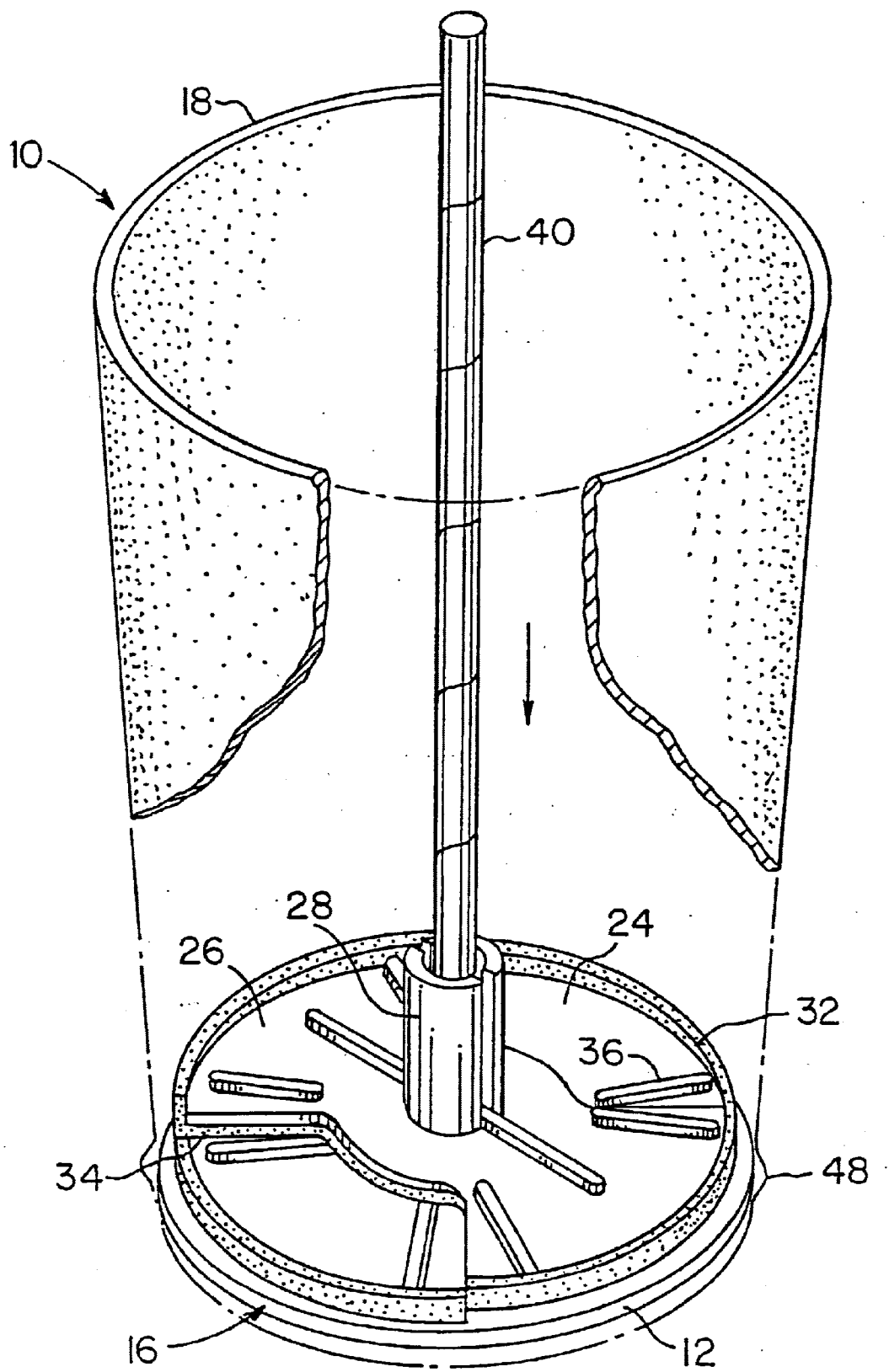
FIG. 2 is a schematic representation showing the beverage device of FIG. 1 with the shield in a closed orientation.

The preferred embodiments of the invention will now be described with respect to the drawings, wherein like reference numerals refer to like parts throughout. A first embodiment of a beverage device 10 is shown in FIGS. 1 and 2. The beverage device 10 comprises a beverage pack 12 for adding flavor to a liquid, such as water. The beverage pack 12 can be a tea bag but is not limited thereto. For instance, the beverage pack 12 can also have coffee or mulling spices, as examples. The beverage device 10 also comprises a shield 14 for substantially encapsulating the beverage pack 12 within a bottom 16 of a vessel, such as a cup 18. The shield 14 is preferably connected to the beverage pack with a string 20.

In this first embodiment, the shield 14 is collapsible from an open orientation, as shown in FIG. 1 to a closed orientation, as shown in FIG. 2. In the open orientation, the shield 14 provides flow channels 22 for allowing the beverage pack 12 to steep. In the closed orientation, the flow channels 22 are closed. Preferably, the shield 14 comprises a first portion 24 and a second portion 26. The first portion 24 is slidably connected to the second portion 26 to allow the shield 14 to be moved from the open orientation to the closed orientation. The first portion 24 can have a slide column 28 about which the second portion 26 slides when it is pushed by a stirrer.

Preferably, the shield 14 comprises a sealing material 32, such as a sponge or the like, disposed on its periphery to seal the shield 14 against the side 30 of the cup 18. Sealing material 34 can also be disposed between the first and second portions 24, 26 for sealing them together when they are in the closed orientation. It should be appreciated that when the shield 14 is in the closed position, the sealing materials 32, 34 seal the interfaces to effectively isolate the beverage pack 12 from the water in the cup above the shield 14. This prevents continued infusion of the material in the beverage pack 12 into the liquid above the shield 14. The sealing material 32 about the periphery also serves to hold the shield 14 in the bottom 16 of the cup 18.

It is most desirable for the beverage pack 12 and shield 14 to float in the water to provide good flow about the beverage pack 12. Thus, the combined density of the beverage pack 12 and the shield 14 should be made to essentially match that of the liquid in the cup or be slightly less than the density of the liquid. The shield 14 is preferably comprised of a sanitary plastic, such as the type of conventional disposable cup lids. The plastic is molded with ridges 36 to provide stiffness and strength to the structure. The second portion 26 has a center ridge 38 which engages with a slot of the slide column 28. The center ridge 38 provides a surface for a stick member 40, such as a stirrer, to engage to first push the entire shield 14 to the bottom 16 of the cup 18 and then to slide the first portion 24 toward the second portion to encapsulate the beverage pack 12 within the bottom 16 of the cup 18. The stick member 40 is then removed.

The beverage infusing apparatus may also include a special drinking vessel or cup having an internal protrusion or notch portion 48 to engage the periphery of the shield 14 when it is pushed into the bottom portion 16 of the cup 18. Alternatively, the cup can have an outwardly directed internal groove running around the cup wall and configured to engage the periphery of the shield 14 to hold the shield 14 in place in the bottom of the cup.

As shown in FIGS. 1 and 2, the present invention is also a beverage system 100. The system 100 comprises a cup 18 having a bottom 16. There is also a beverage pack 12, such as a tea bag, for adding flavor to a liquid. The beverage system 100 also comprises a shield 14 for encapsulating the pack 12 within the bottom 16 of the cup 18. Preferably, the shield 14 is connected to the beverage pack 12 with a string 20. The system 100 can also comprise a stick member 40, such as a stirrer, for pushing the shield 14 to the bottom 16 of the cup 18. The shield 14 can be constructed as previously described or other constructions can be used as will be described hereinafter. Preferably, the cup 18 has a notch portion 48 at the bottom 16 for engaging with the shield 14 when the shield 14 is pushed down.

Figure 3:
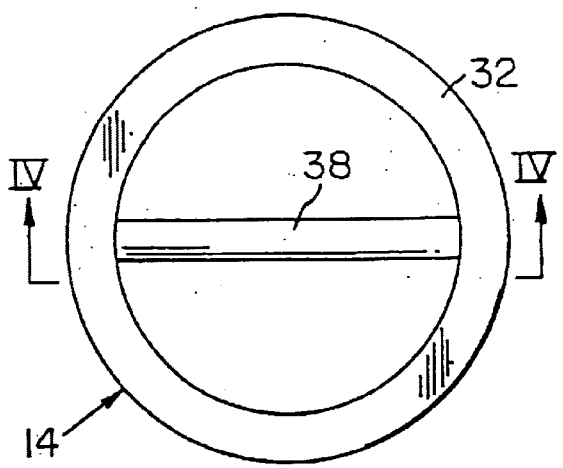
FIG. 3 is a plan view of an alternative embodiment of the shield of the present invention.
Figure 4:
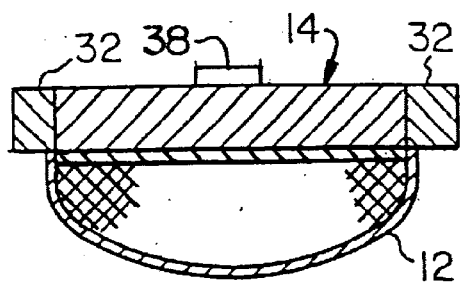
FIG. 4 is a side view of a beverage pack attached the shield of FIG. 3.

An additional embodiment of the present invention is shown in FIGS. 3 and 4. In this embodiment, the shield 14 is a single piece shield arrangement. The shield 14 is preferably disc-shaped, and made of a relatively light-weight material. The shield 14 is preferably 1 mm, more or less, in thickness. A stick member, such as a stirrer, can be used for pushing the shield 14 to the bottom of the beverage container. Such a single piece shield 14 can preferably be used with a conical-shaped cup or alternatively, a cup having a greater conical taper from top to bottom, such that the bottom has a substantially smaller diameter than the top. Alternatively, the shield can also be used with a straight walled cup having a notch portion near the bottom to hold the shield 14 in the bottom of the cup. A tea bag or other beverage pack 12 may be connected to the bottom of the shield 14, for example by a string which may be shorter than that shown FIG. 1. Alternatively, the tea bag or other beverage pack 12 can be connected directly to the bottom of the shield 14 by other means, such as various types of glue or staples connecting the bag directly to the bottom of the shield 14, as shown in FIG. 4. Alternatively, an unconnected beverage pack could also be used. The diameter of the shield 14 is preferably slightly larger than the tea bag so that when the beverage has reached its desired strength, the shield 14 can be pushed toward the bottom of the cup or into the conical cup to seal the beverage pack in the bottom of the cup. Preferably, the shield 14 comprises a sealing material 32, such as in an already described first embodiment. The sealing material 32 could be a material, such as a sponge, disposed on the periphery of the shield 14 to seal the shield 14 against the sides of the cup, when the shield is pushed to the bottom of the cup and to assist in holding the shield 14 in place and preferably holding the shield 14 fast in place.

Figure 5:
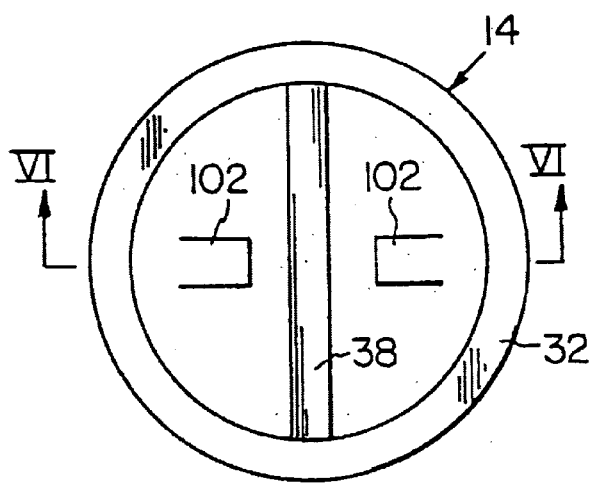
FIG. 5 is an alternative embodiment of the shield the present invention.
Figure 6:
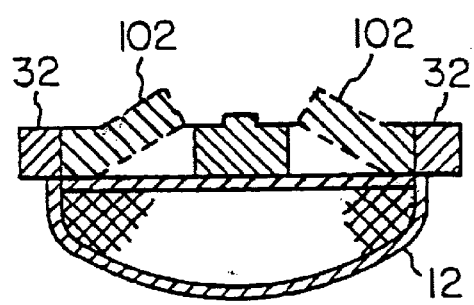
FIG. 6 is a side, sectional view taken along the line VI—VI of FIG. 5.

In an alternative embodiment of the present invention shown in FIGS. 5 and 6, the shield 14 can be equipped with a valve arrangement. The shield 14 is preferably disc-shaped and constructed of a light-weight material. The shield 14 is preferably 1 mm, more or less, in thickness. A stick member, such as a stirrer, can be used for pushing the shield 14 to the bottom of the beverage container. The valve arrangement is formed by a pair of cut flaps 102 in the shield 14 which, as shown by dotted lines in FIG. 6, open by fluid pressure during the downward insertion of the shield 14 into the cup and close during other times. The flaps 102 preferably have a sufficient rigidity to bias the flaps 102 to the closed position such that they close once the shield 14 is forced to the bottom of the cup. This prevents further fluid transfer between the opposite faces of the shield 14 and thus substantially prevents further steeping of the beverage. Preferably, the shield 14 comprises, as described above, a sealing material 32, such as a sponge, disposed on its periphery to seal the shield 14 against the sides of the cup, and to assist in holding the shield arrangement in place.

Figure 8:
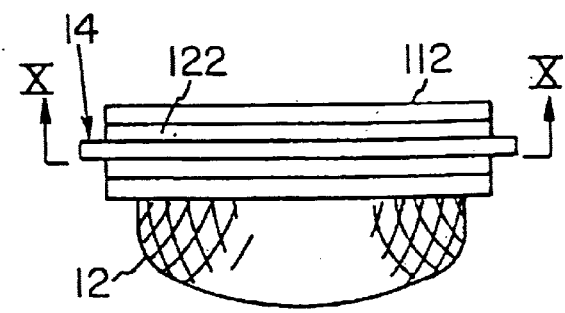
FIG. 8 is an assembled view of the shield and beverage pack assembly of FIG. 7.
Figure 9:
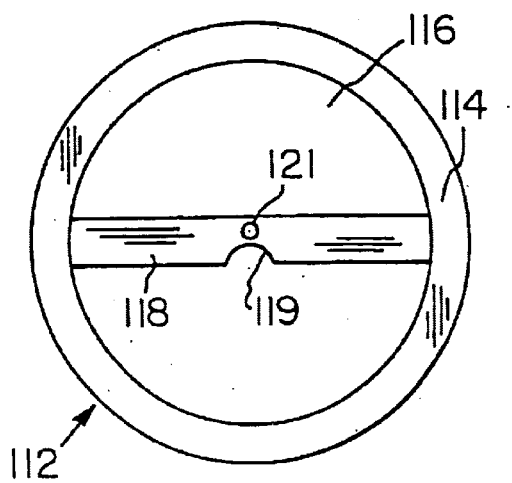
FIG. 9 is a plan view of a first shield member.
Figure 7:
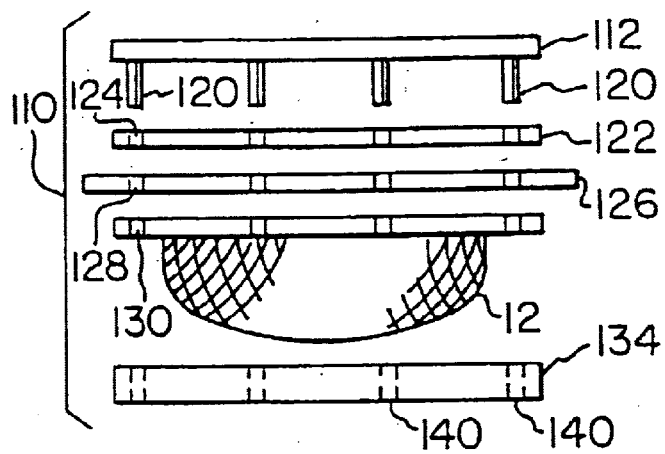
FIG. 7 is an expanded view of an alternative embodiment of a shield and beverage pack assembly of the present invention.

FIGS. 7–12 show the preferred embodiment of the present invention. As shown in FIGS. 7 and 8, a shield and beverage pack assembly 110 includes a shield 14 and a beverage pack 12, with the beverage pack 12 preferably in the form of a mesh basket. Alternatively, conventional tea bag paper can be used. As shown in FIGS. 7 and 9, the shield 14 includes a substantially circular first member 112 having an outer rim 114 and a hollow interior 116. A pressing member 118 extends between, and is connected to, opposite sides of the outer rim 114. The pressing member 118 includes a groove 119 which can be used to support a spoon during steeping or drinking of the beverage. This groove 119 can be part of a decorative pattern. A plurality of pins 120 project downwardly from the bottom of the first member 112. The pressing member 118 also includes an indentation 121 in the top surface thereof which is preferably located near the middle of the pressing member 118. One end of the stick member 40 can be placed in the indentation 121 when pressing the shield 14 toward the bottom of the cup.

Figure 10:
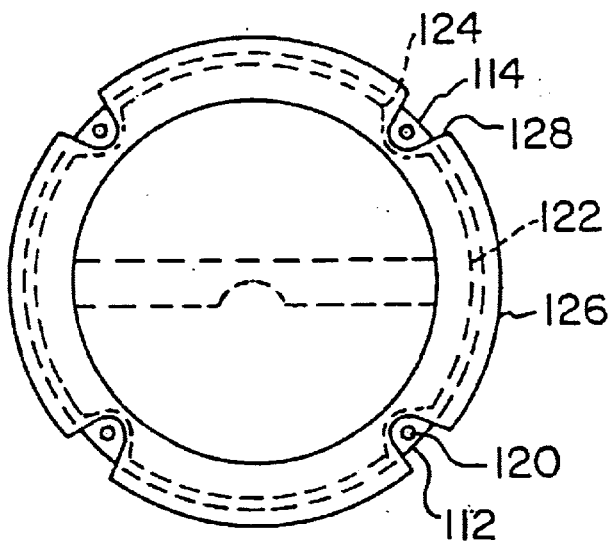
FIG. 10 is a sectional view of the shield and beverage pack assembly taken along the line X—X of FIG. 8.

As shown in FIGS. 7 and 10, a first sealing layer 122, for example, of tea bag fabric, is positioned adjacent the bottom of the first member 112. The first sealing layer 122 is substantially circular and includes a plurality of groove portions 124 through which the pins 120 of the first member 112 extend. The outside diameter of the first sealing layer 122 is slightly less than the outside diameter of the first member 112. A second sealing layer 126 is preferably located adjacent the first sealing layer 122. As shown in FIGS. 7 and 10, the second sealing layer 126 includes groove portions 128 through which the pins 120 of the first member 112 extend. The outside diameter of the second sealing layer 126 is larger than that of the first member 112 such that a flap-like portion of the second sealing layer 126 extends beyond the outer circumference of the first member 112. The second sealing layer 126 can be comprised of tea bag fabric like the first sealing layer 122 or preferably, may be comprised of material that becomes impermeable or swells in water, for example, rubber or woven material, in which case the second sealing layer 126 provides a substantially liquid impermeable barrier between the beverage pack 12 and the first member 112.

The beverage pack 12 in this preferred embodiment comprises a net-like basket which can be used to contain tea or other material, such as mulling spices or coffee. This basket can be made of regular tea bag paper or, preferably, can be made of larger mesh material to permit the use of regular sized tea leaves in the basket. The beverage pack 12 includes a plurality of bores 130 which, as shown in FIGS. 7 and 8, align with the pins 120 of the first member 112.

Figure 11:
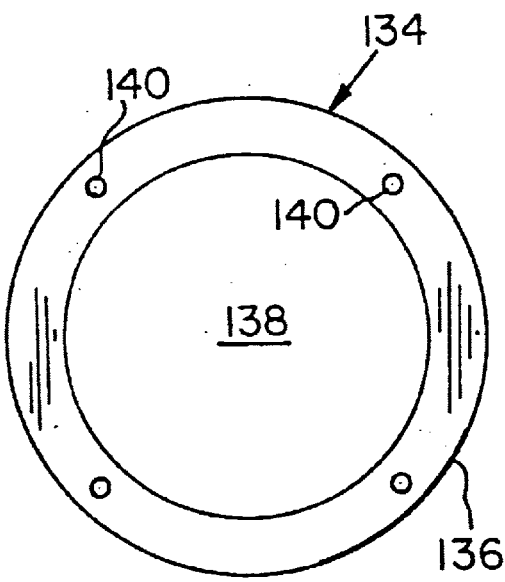
FIG. 11 is a plan view of a second shield member.

As shown in FIGS. 7 and 11, the shield 12 further includes a substantially circular second member 134 having an outer rim 136 and a hollow interior 138. The outer rim 136 includes a plurality of bores 140 which, as shown in FIGS. 7 and 8, align with the pins 120 of the first member 112. In the preferred method of assembling the assembly 110, the first member 112, first sealing layer 122, second sealing layer 126, beverage pack 12 and second member 134 are arranged as shown in FIG. 7 such that when the first member 112 and second member 134 are moved toward each other, the pins 120, depending from the first member 112, extend through the groove portions 124 and 128, through the bores 130 of the beverage pack 12 and snap into the bores 140 of the second member 134 to hold the assembly 110 together.

Figure 12:
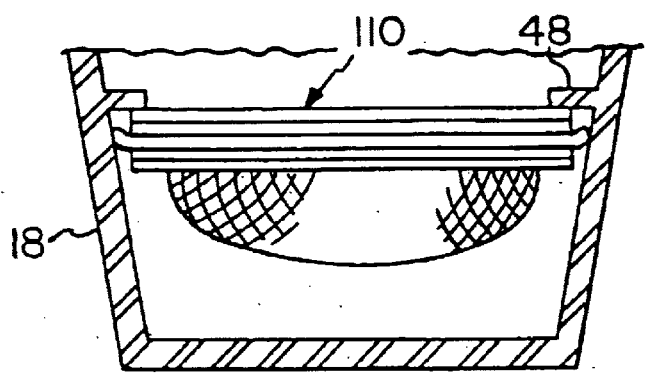
FIG. 12 is a side, sectional view of the shield and beverage pack assembly shown in FIG. 7 positioned within the bottom of a cup.

FIG. 12 shows the assembly 110 held in the bottom 16 of the cup 18 after steeping of the beverage. The flap-like portions of the second sealing layer 126 lie against the side 30 of the cup and help create a substantially liquid impermeable barrier to prevent further steeping of the material in the beverage pack 12 while the assembly 110 is encapsulated in the bottom of the cup. The assembly 110 is pushed to the bottom of the cup by applying pressure on the pressing member 118 with, for example, a stirrer. The assembly 110 is pushed toward the bottom of the cup until the shield 14 is forced past the notch portion 48, thus substantially encapsulating the assembly 110 in the bottom of the cup.

The present invention can be designed in a reusable or disposable form. In the reusable form, the beverage pack 12 may be attached to the shield 14 by preferably inserting the string attached to the beverage pack into an insert provided on the shield 14. Alternatively, a slot could be provided in the shield for threading of the string thereinto. In a further embodiment, the beverage pack can preferably be stapled or adhered to the shield. The shield can preferably be made of variable diameters for use with various sized cups, and for use with existing cups having an essentially cylindrical wall with no notches therein, the self-sealing material can preferably be configured to hold the shield frictionally in place in the cup.

In an additional possible alternative embodiment of the present invention, a shield can preferably be comprised of two portions similar to those shown in FIG. 2 that twist with respect to one another to provide an open position and a closed position. The shield is preferably disc-shaped and constructed of a light-weight material. The shield is preferably 1 mm, or more or less in thickness. A stick member, such as a stirrer, can be used for pushing the shield to the bottom of the beverage container. Preferably, the shield comprises, as described above, a sealing material, such as a sponge, disposed on its periphery to seal the shield against the sides of the cup, and at least assist in holding the shield in place.

In yet an additional possible embodiment of the present invention, the shield can preferably be designed for use with a thermos, such as a Dewar flask, or similar beverage container. The shield is preferably disc-shaped and constructed of a light-weight material. The shield is preferably 1 mm, or more or less in thickness. A stick member, such as a stirrer or straw or similar stick, can be used for pushing the shield to the bottom of the thermos or similar beverage container. The shield can preferably be made of variable diameters for use with various sized thermoses, such as a Dewar flask, and similar beverage containers. Preferably, the shield comprises, as described above, a sealing material, such as a sponge, disposed on its periphery to seal the shield against the sides of the thermos, such as a Dewar flask, or similar beverage container, and at least assist in holding the shield in place. The shield can preferably be a single piece structure or a two piece structure, as described above. The stick member can preferably be of various lengths to accommodate the size of the thermos, such as a Dewar flask, or similar beverage container.

In yet an additional possible embodiment of the present invention, the shield can preferably be designed for use with a jug or similar beverage container. The shield arrangement is preferably disc-shaped and constructed of a light-weight material. The shield is preferably 1 mm, or more or less in thickness. A stick member, such as a stirrer or straw or similar stick, can be used for pushing the shield to the bottom of the jug or similar beverage container. The shield can preferably be made of variable diameters for use with various sized jugs and similar beverage containers. Preferably, the shield comprises, as described above, a sealing material, such as a sponge, disposed on its periphery to seal the shield against the sides of the jug or similar beverage container, and at least assist in holding the shield in place. The shield can preferably be a single piece structure or a two piece structure, as described above. The stick member can preferably be of various lengths to accommodate the size of the jug or similar beverage container.

In yet an additional possible embodiment of the present invention, the shield can preferably be designed for use with a pitcher or similar beverage container. The shield is preferably disc-shaped and constructed of a light-weight material. The shield is preferably 1 mm, or more or less in thickness. A stick member, such as a stirrer or straw or similar stick, can be used for pushing the shield to the bottom of the pitcher or similar beverage container. The shield can preferably be made of variable diameters for use with various sized pitchers and similar beverage containers. Preferably, the shield comprises, as described above, a sealing material, such as a sponge, disposed on its periphery to seal the shield against the sides of the pitcher or similar beverage container, and at least assist in holding the shield in place. The shield can preferably be a single piece structure or a two piece structure, as described above. The stick member can preferably be of various lengths to accommodate the size of the pitcher or similar beverage container.

In yet an additional possible embodiment of the present invention, the shield can preferably be designed for use with a tea urn or similar beverage container. The shield is preferably disc-shaped and constructed of a light-weight material. The shield is preferably 1 mm, or more or less in thickness. A stick member, such as a stirrer or straw or similar stick, can be used for pushing the shield to the bottom of the urn or similar beverage container. The shield can preferably be made of variable diameters for use with various sized urns and similar beverage containers. Preferably, the shield comprises, as described above, a sealing material, such as a sponge, disposed on its periphery to seal the shield against the sides of the urn or similar beverage container, and at least assist in holding the shield in place. The shield can preferably be a single piece structure or a two piece structure, as described above. The stick member can preferably be of various lengths to accommodate the size of the urn or similar beverage container.

In yet an additional possible embodiment of the present invention, the shield can preferably be designed for use with a tea kettle or similar beverage container. The shield is preferably disc-shaped and constructed of a light-weight material. The shield is preferably 1 mm, or more or less in thickness. A stick member, such as a stirrer or straw or similar stick, can be used for pushing the shield to the bottom of the kettle or similar beverage container. The shield can preferably be made of variable diameters for use with various sized kettles and similar beverage containers. Preferably, the shield comprises, as described above, a sealing material, such as a sponge, disposed on its periphery to seal the shield against the sides of the kettle or similar beverage container, and at least assist in holding the shield in place. The shield can preferably be a single piece structure or a two piece structure, as described above. The stick member can preferably be of various lengths to accommodate the size of the kettle or similar beverage container.

In yet an additional possible embodiment of the present invention, the shield can preferably be designed for use with a tea pot or similar beverage container. The shield is preferably disc-shaped and constructed of a light-weight material. The shield is preferably 1 mm, or more or less in thickness. A stick member, such as a stirrer or straw or similar stick, can be used for pushing the shield to the bottom of the pot or similar beverage container. The shield can preferably be made of variable diameters for use with various sized pots and similar beverage containers. Preferably, the shield comprises, as described above, a sealing material, such as a sponge, disposed on its periphery to seal the shield against the sides of the pot or similar beverage container, and at least assist in holding the shield in place. The shield can preferably,be a single piece structure or a two piece structure, as described above. The stick member can preferably be of various lengths to accommodate the size of the pot or similar beverage container.

Alternatively, in an additional possible embodiment of the present invention, the shield can preferably be dome shaped. The shield is preferably disc-shaped and constructed of a light-weight material. The shield is preferably 1 mm, or more or less in thickness. A stick member, such as a stirrer, can be used for pushing the shield to the bottom of the beverage container. Preferably, the shield comprises, as described above, a sealing material, such as a sponge, disposed on its periphery to seal the shield against preferably the sides or bottom of the beverage container, and at least assist in holding the shield in place.

The present embodiments of the present invention can be combined to obtain yet further embodiments.

While embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A beverage device to be placed within a vessel having a bottom to add flavor to a liquid in the vessel, the beverage device comprising:

a shield; and a beverage pack for adding flavor to the liquid, wherein the beverage pack is attached to the shield, wherein the shield includes a first member, at least one sealing layer located between the first member and the beverage pack and a second member, wherein the first member is configured to engage the second member, and wherein the shield is configured to substantially encapsulate the beverage pack within the bottom of the vessel when the beverage device is pushed to the bottom of the vessel after the flavor is added to the liquid to prevent further addition of flavor to the liquid.

2. A device as described in claim 1, wherein the beverage pack comprises a tea bag.

3. A device as described in claim 1, wherein the shield comprises sealing material disposed on a periphery of the shield to seal the shield against a side of the vessel when the beverage device is pushed to the bottom of the vessel.

4. A device as described in claim 1, wherein a combined density of the beverage pack and the shield substantially matches that of the liquid in the vessel.

5. A device as described in claim 1, wherein the first member includes a plurality of pins depending therefrom and the second member includes a plurality of bores configured to engage the pins of the first member to engage the first member with the second member.

6. The device as claimed in claim 1, wherein the beverage pack is configured as a mesh basket.

7. The device as claimed in claim 1, wherein the first member includes an outer rim with a hollow interior, with a pressing member extending between and connected to opposite sides of the outer rim.

8. The device as claimed in claim 1, including a plurality of pins projecting from the first member.

9. The device as claimed in claim 1, including a first sealing layer located adjacent a bottom of the first member.

10. The device as claimed in claim 1, wherein the second member has an outer rim and a hollow interior and wherein the outer rim of the second member includes a plurality of bores configured to align with pins projecting from the first member such that the pins engage the bores to engage the first member with the second member.

11. The device as claimed in claim 1, wherein the vessel includes a notch portion and the shield is configured to engage the notch portion when the shield is pushed to the bottom of the vessel to hold the shield in the bottom of the vessel.

12. The device as claimed in claim 8, wherein the beverage pack includes a plurality of bores configured to align with the pins of the first member.

13. The device as claimed in claim 9, wherein the first sealing layer includes a plurality of groove portions, with the pins of the first member configured to extend through the groove portions.

14. The device as claimed in claim 9, including a second sealing layer located adjacent the first sealing layer.

15. The device as claimed in claim 14, wherein the second sealing layer includes groove portions through which the pins of the first member extend.

16. The device as claimed in claim 14, wherein an outside diameter of the second sealing layer is larger than an outside diameter of the first member such that the second sealing layer forms a flap-like portion extending beyond an outer circumference of the first member such that when the beverage device is pushed to the bottom of the vessel, the flap-like portion abuts the side of the vessel to create a substantially liquid impermeable barrier.

17. The device as claimed in claim 14, wherein the second sealing layer comprises material that becomes impermeable or swells in water such that the second sealing layer forms a substantially liquid impermeable barrier between the beverage pack and the first member.

18. A beverage device to be placed within a vessel having sides and a bottom to add flavor to a liquid in the vessel, the device comprising:

a shield; and a beverage pack for adding flavor to the liquid, wherein the beverage pack is attached to the shield, wherein the shield includes:
   a first member having a plurality of pins projecting therefrom;
   a first sealing layer located adjacent the first member;
   a second sealing layer located adjacent the first sealing layer; and
   a second member having a plurality of bores configured to engage the pins on the first member to engage the first member with the second member,
   wherein when the shield is pushed to the bottom of the vessel, at least a portion of the shield abuts the sides of the vessel to hold the shield in the bottom of the vessel to substantially encapsulate the beverage pack at the bottom of the vessel.

19. The device as claimed in claim 18, wherein the first member includes an outer rim with a hollow interior, with the pins projecting from the outer rim.

20. A beverage device to be placed within a vessel having sides and a bottom to add flavor to a liquid in the vessel, the beverage comprising:

a shield; and a beverage pack for adding flavor to the liquid, wherein the beverage pack is attached to the shield, wherein the shield includes:
   a first member having a plurality of pins projecting therefrom;
   a first sealing layer located adjacent the first member, the first sealing layer including a plurality of groove portions, with the pins of the first member configured to extend through the groove portions of the first sealing layer;
   a second sealing layer located adjacent the first sealing layer, wherein the second sealing layer includes a plurality of groove portions through which the pins of the first member extend, wherein the outside diameter of the second sealing layer is larger than that of the first member such that a flap-like portion of the second sealing layer extends beyond a circumference of the first member; and
   a second member having an outer rim with a hollow interior, wherein the second member includes a plurality of bores configured to engage the pins of the first member to engage the first member with the second member, and
   wherein when the shield is pushed to the bottom of the vessel, the flap-like portions of the second sealing layer abut the sides of the vessel to encapsulate the beverage pack at the bottom of the vessel.

* * * * *